United States Patent [19]
Niessner et al.

[11] Patent Number: 5,180,804
[45] Date of Patent: Jan. 19, 1993

[54] IMPROVING THE WATER ABSORPTION CAPACITY OF CROSSLINKED, WATER-SWELLABLE POLYMERS

[75] Inventors: Manfred Niessner, Schifferstadt; Juergen Beck, Mannheim; Heinrich Hartmann, Limburgerhof, all of Fed. Rep. of Germany; Andreas H. Kemna, Goleta, Calif.; Stefan Wickel, Ludwigshafen, Fed. Rep. of Germany

[73] Assignee: BASF Aktiengesellschaft, Ludwigshafen, Fed. Rep. of Germany

[21] Appl. No.: 564,083

[22] Filed: Aug. 8, 1990

[30] Foreign Application Priority Data

Aug. 8, 1989 [DE] Fed. Rep. of Germany ....... 3926169

[51] Int. Cl.⁵ .................................................. C08F 6/14
[52] U.S. Cl. ................................. 528/500; 526/318.43
[58] Field of Search ................................ 528/500, 499

[56] References Cited

U.S. PATENT DOCUMENTS

4,286,082 8/1981 Tsubakimoto et al. .
4,769,427 9/1988 Nowakowsky et al. .

FOREIGN PATENT DOCUMENTS

0289338 2/1988 European Pat. Off. .

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

The water absorption capacity of crosslinked, water-swellable polymers is improved by a process in which a water-containing, finely divided polymer gel having a solids content of from 20 to 65% by weight is treated with steam at not less than 50° C., the solids content of the water-containing polymer gel increasing by not more than 30% by weight, and the polymer gel is then dried in a conventional manner.

5 Claims, No Drawings

IMPROVING THE WATER ABSORPTION CAPACITY OF CROSSLINKED, WATER-SWELLABLE POLYMERS

Finely divided, crosslinked, water-swellable polymers are used in practice as water-absorbing agents, for example in diapers. Experience has shown that in the case of these polymers, good water absorption is accompanied by a high content of soluble fractions in the polymer. The water absorption capacity of these polymers shows a linear correlation over wide ranges with the soluble fractions present in the polymer. The lower the content of bifunctional or polyfunctional crosslinking agents in the polymer, the more wide-meshed is the polymer network. Such polymers have greater swellability in water, which is equivalent to a higher water absorption than in the case of polymers which contain large amounts of polymerized crosslinking agents. A decreasing cross-linking density in the polymer results in fewer and fewer polymer molecules being incorporated in the network and in nonbonded polymer molecules remaining soluble in water.

Processes for the preparation of crosslinked, water-absorbing polymers are known. For example, in the process of U.S. Pat. No. 4,286,082, partially or completely neutralized acrylic acid is polymerized in the presence of bifunctional or polyfunctional crosslinking agents in not less than 25% strength by weight aqueous solution and in the presence of surfactants. EP-A 0 243 768 discloses a process for the preparation of bead polymers based on water-soluble ethylenically unsaturated monomers by the method of reverse suspension polymerization In this process, the polymerization can also be carried out in the presence of crosslinking agents, so that water-absorbing crosslinked polymers are formed. In the process of U.S. Pat. No. 4,769,427, crosslinked, finely divided, gel-like polymers are prepared by polymerization of ethylenically unsaturated carboxylic acids in the presence of bifunctional or polyfunctional crosslinking agents in a kneader. EP-A-0 289 338 discloses a process for the preparation of water-absorbing polymers which have a low residual monomer content. In this process, a water-containing polymer gel is dried by the action of steam or of an inert gas and steam at from 80° to 250° C. According to the Examples, the polymer gel is dried to solids contents of more than 90% by weight. The stated publications give no indication of an increase in the water absorption capacity of the crosslinked polymers.

It is an object of the present invention to provide a process which makes it possible to obtain crosslinked, water-swellable polymers having an improved water absorption capacity coupled with a very low content of soluble fractions in the polymer.

We have found that this object is achieved, according to the invention, by a process for improving the water absorption capacity of crosslinked, water-swellable polymers if a water-containing, finely divided polymer gel having a solids content of from 20 to 65% by weight is treated with steam at not less than 50° C., the solids content of the water-containing polymer gel increasing by not more than 30% by weight, and the polymer gel is then dried in another, conventional manner.

The increase in the water absorption capacity of crosslinked, water-swellable polymers by the novel process can be achieved both in the case of water-containing, particulate polymers obtained in any polymerization process and for crosslinked, water-swellable polymers in commercial form. In the case of water-absorbing polymers in commercial form, water is first added to the dry polymer, which is allowed to swell so that it is converted into a polymer gel having a solids content of from 20 to 65% by weight.

However, water-containing polymer gels having a solids content of from 20 to 65% by weight are formed in the conventional polymerization processes for the preparation of the crosslinked, water-swellable polymers. In these cases, the water-containing, particulate cross-linked polymer is heated to not less than 50° C. in a suitable reactor and is treated with steam, if necessary with thorough mixing, and then dried in a conventional manner, for example in a drying oven under reduced pressure, by azeotropic removal of water or in a stream of hot air. The polymer treated in this manner may be comminuted and compounded.

Crosslinked, water-swellable polymers which can be treated according to the invention to increase the water absorption capacity are known from the publications stated at the outset. They can be prepared by various polymerization processes, for example by the method of reverse suspension polymerization or by polymerization of from 20 to 65% strength by weight aqueous monomer solutions on a belt or in a kneader. For the preparation of water-absorbing polymers, water-soluble monoethylenically unsaturated monomers are polymerized, preferably in the presence of crosslinking agents. Examples of suitable water-soluble monoethylenically unsaturated monomers are ethylenically unsaturated $C_3$–$C_5$-carboxylic acids and their amides and esters with amino alcohols of the formula

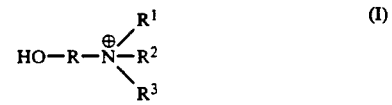

where R is $C_2$–$C_5$-alkylene and $R^1$, $R^2$ and $R^3$ are each H, $CH_3$, $C_2H_5$ or $C_3H_7$. These compounds are, for example, acrylic acid, methacrylic acid, crotonic acid, itaconic acid, maleic acid, fumaric acid, acrylamide, methacrylamide, crotonamide, dimethylaminoethyl acrylate, diethylaminoethyl acrylate, dimethylaminoethyl acrylamide, dimethylaminopropyl methacrylamide, dimethylaminopropyl acrylate, dimethylaminobutyl acrylate, diethylaminoethyl methacrylate, dimethylaminoethyl methacrylate, dimethylaminopropyl acrylate, dimethylaminoneopentyl acrylate and dimethylaminoneopentyl methacrylate. The basic acrylates and methacrylates are used in the form of the salts with strong mineral acids or carboxylic acids or in quaternized form. The anion $X^\ominus$ for the compounds of the formula I is the acid radical of the mineral acids or of the carboxylic acids or methosulfate, ethosulfate or halogen from a quaternizing agent. Further water-soluble monomers are N-vinylpyrrolidone, acrylamidopropanesulfonic acid, vinylphosphonic acid and/or alkali metal or ammonium salts of vinylsulfonic acid. The other acids may likewise be used in the polymerization either in unneutralized form or in partially or completely neutralized form. The stated monomers can be employed in the polymerization either alone or as a mixture with one another, so that either homopolymers or copolymers are obtained. Preferred monomers of this group are acrylic acid and methacrylic acid. The monomers can be copolymerized with one another in any ratio.

The polymerization of the stated water-soluble monomers is preferably carried out in the presence of crosslinking agents. The crosslinking agents contain not less than two ethylenically unsaturated double bonds, suitable crosslinking agents being, for example, N,N'-methylenebisacrylamide, polyethylene glycol diacrylates and polyethylene glycol dimethacrylates, each of which is derived from polyethylene glycols having a molecular weight of from. 126 to 8,500, and trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, adducts of ethylene oxide and/or propylene oxide with trimethylolpropane, which have been diesterified or triesterified with acrylic acid or methacrylic acid, polyhydric alcohols, such as glycerol or pentaerythritol, which have been diesterified or polyesterified with acrylic acid or methacrylic acid, and triallylamine, tetraallylethylene diamine, divinylbenzene, diallyl phthalate, polyethylene glycol divinyl ether, trimethylolpropane diallyl ether, butanediol divinyl ether, pentaerythritol triallyl ether and/or divinylethyleneurea. Water-soluble crosslinking agents, eg. N,N'-methylenebisacrylamide, polyethylene glycol diacrylates, polyethylene glycol dimethacrylates, pentaerythritol triallyl ether and/or divinylurea, are preferably used. The crosslinking agents are employed in an amount of from 0.001 to 5, preferably from 0.01 to 2, % by weight, based on the monomer mixture.

The polymerization is carried out in the presence of the conventional polymerization initiators, which are used in amounts of from 0.01 to 5, preferably from 0.2 to 3, % by weight, based on the monomers employed in the polymerization. If desired, conventional regulators, such as thioglycollic acid, mercaptoalcohols, eg. 2-mercaptoethanol, mercaptopropanol or mercaptobutanol, dodecyl mercaptan, formic acid or hydroxylammonium sulfate, may be present during the polymerization. The polymerization can be carried out continuously or batchwise at from 20° to 200° C., preferably from 40° to 150°

For the increase, according to the invention, of the water absorption capacity of the crosslinked polymers, polymer gels having a solids content of from 20 to 65, preferably from 30 to 58, % by weight are used as starting materials. The polymer gels must be in the form of particles and should as far as possible be capable of being stirred substantially without sticking together. The size of the gel particles has virtually no effect on the resulting increase in the water absorption capacity. However, larger particles require longer treatment with steam. Hence, gel particles which have a maximum volume of not more than 150 ml, preferably not more than 10 ml, are preferably used for this process step. The particle diameter is from 0.1 to 60 mm, preferably from 0.5 to 30 mm.

For the treatment with steam, all apparatuses in which the polymer can be circulated or stirred are in principle suitable, for example kneaders, tumble driers, paddle driers, rotary ovens, disk driers, kettles equipped with a helical ribbon stirrer, bins with stirrers or a fluidized bed. In the stated apparatuses, agglomeration of the water-containing gel particles is prevented. If agglomeration of the gel particles is tolerable in the subsequent process steps, it is also possible to treat a non-circulated water-containing gel with steam. For example, belt driers, bins, kettles and stripping columns are suitable for this purpose.

Preferably, circulation of the water-containing polymer gel is ensured during the steam treatment. Furthermore, it is possible to force the steam through the bed of the product. This process variant is preferably used, both in the apparatuses in which the polymer is circulated and in the apparatuses in which no mechanical mixing is carried out.

The water-containing polymer gel is heated in one of the apparatuses described above to a temperature at which less than 50% of the steam passed in condenses under the prevailing pressure. During the steam treatment, the solids content of the water-containing polymer gels should increase by not more than 30, preferably 10, % by weight. In a particularly preferred process variant, the solids content shows virtually no change during the steam treatment. The temperature to which the water-containing gel-like polymer is heated is from 50 to 200° C., preferably from 60° to 200° C. Sufficiently short treatment times and virtually no damage to the product during the treatment with steam are achieved in the temperature range from 70° to 170° C.

The steam required for the treatment of the water-containing polymer gels may be saturated or superheated. The temperature of the steam prior to contact with the water-containing polymer gel may be from 50° to 250° C., preferably from 60 to 180° C. In general, steam at from 80° to 150° C. is used. The vapor pressure depends on the vapor temperature and the degree of saturation of the steam. The amount of steam required depends on the parameters pressure, temperature and residence time. It is in general from 0.1 to 10 parts by weight of steam per part by weight of polymer gel. For cost reasons, amounts of steam which are less than 10 times the amount of polymer used, based in each case on the weight of steam and polymer, eg. from 0.3 to 7 parts by weight of steam per part by weight of polymer gel, are preferred. The residence time of the water-containing polymer gel during the steam treatment is dependent on various factors, for example on the properties of the water-containing polymer gel to be treated, on the type and dimensions of the apparatus and on the method of introduction of the steam. The steam treatment may last from 5 minutes to 5 hours, preferably from 10 minutes to 4 hours. The steam treatment can be carried out under from 0.1 to 15, preferably from 0.3 to 10, bar. An internal reactor pressure of from 0.6 to 8 bar absolute is particularly preferred. To prevent agglomeration and adhesion during the steam treatment of the water-containing polymer gels, it is advisable in some cases to add assistants to the gel before or during the steam treatment Examples of suitable assistants are water-soluble polymers, such as polyvinyl alcohol or polyvinylpyrrolidone, polyelectrolytes, such as salts of polyacrylic acid, polymethacrylic acid, cationic polyacrylamides and polydiallyldimethylammonium chloride Furthermore, the addition of surfactants, of polymers having hydrophobic and hydrophillic moieties, such as ethylene oxide/propylene oxide block copolymers, of inorganic salts, such as calcium sulfate or tricalcium phosphate, or of minerals, such as bentonite, china clay, silicates, salicylic acids and silica, and of Pickering dispersants, prevents caking of the water-containing polymer particles during the steam treatment.

The amount of assistants added is from 0.1 to 5% by weight, based on the solid polymer.

In the examples which follow, percentages are by weight unless expressly stated otherwise.

EXAMPLES

General Method

For the treatment with steam

The crosslinked, water-swellable polymers described in the examples were introduced into a preheated paddle drier and heated therein to the particular temperature required, with constant circulation. After the water-containing, finely divided polymer gel had reached the desired treatment temperature, steam was passed into the paddle drier, under the conditions stated in each of the examples. Before, during and after the treatment with steam, samples were taken and investigated. For this purpose, the samples were first dried in a drying oven under reduced pressure, then milled and sieved. The absorption capacity of the dry powder was determined. On the other hand, the residual content of acrylic acid monomer was determined using the non-dried material, in order to eliminate the effect of the drying conditions.

Determination of the Absorption Capacity 1. Teabag

The absorption capacity of the crosslinked, water-swellable polymers was determined by the teabag test. The liquid used was a 0.9% strength sodium chloride solution. A defined amount of water-absorbing copolymer (0.2 g) was introduced in each case into a teabag, which was then closed. The dimensions of the teabag were adapted to the amount of copolymer weighed in. The teabag was then immersed in the liquid for a certain time (10 min), allowed to drip off for 10 minutes and then reweighed To calculate the absorption capacity, it was therefore necessary to carry out a blank test in which a teabag without gel-like water-absorbing copolymer was immersed in the solution and the weight of the teabag determined after the abovementioned drip-off time. The absorption capacity of the dry polymer was then obtained from the following relationship, in which the chosen abbreviations have the following meanings:

$W_{TP}$: Weight of teabag with polymer gel
$W_T$: Weight of teabag in blank test
$W_P$: Weight of polymer gel weighed in $$\text{Absorption capacity} = \frac{W_{TP} - W_T}{W_P}$$

2. Retention

The retention was determined by a procedure similar to that for the determination of the teabag test described above under 1. After removal of the teabag with the swollen polymer, however, the teabag was centrifuged for 10 min at 150 g to remove water adhering to the surface between the gel particles, and was then reweighed. In the blank test, too, the teabag without water-absorbing polymer was centrifuged at 150 g, after which the weight of the centrifuged teabag was determined. The retention was then obtained from the following relationship:

$$\text{Retention} = \frac{W_{TPc} - E_{Tc}}{W_P}$$

where $W_{TPc}$ is the weight of the centrifuged teabag with polymer gel,
$W_{Tc}$ is the weight of the centrifuged teabag in the blank test and
$W_P$ is the weight of the polymer gel weighed in.

EXAMPLE 1

For the preparation of a water-containing polymer gel, a 43% strength aqueous solution of acrylic acid neutralized to an extent of 75 mol % with sodium hydroxide solution is first prepared. This solution is heated to 40° C. together with 0.04 mol %, based on acrylic acid, of a polyethylene glycol diacrylate whose polyethylene glycol segment has a mean molecular weight of 1500 g/mol, and in the presence of 70 ppm of diethylenetriaminepentasodium acetate, in a kneader whose wall temperature is 60° C., with thorough mixing. As soon as the solution has reached this temperature, an aqueous solution of peroxydisulfate is added, followed by an aqueous solution of sodium disulfite. The temperature of the reaction mixture then increases to 69° C. As soon as the maximum reaction temperature has been reached, the monomer conversion is about 89%. The viscosity of the reaction mixture increases relatively rapidly with increasing conversion. This is detectable, for example, from the power consumption of the stirrer of the kneader. At the maximum temperature, 1%, based on the monomers used, of the sodium salt of a $C_{14}$-alkylsulfonic acid is then added. The addition of the surfactant to the reaction mixture leads within a few seconds to a disintegration of the originally cohesive polymer gel into small particles. At the same time, the power consumption of the kneader stirrer, which increased during the polymerization reaction, decreases to a value measured before the beginning of the polymerization during stirring of the monomer solution, which virtually had the viscosity of water. The finely divided polymer gel is then kept at 60° C. for 10 minutes, removed from the kneader and then subjected to the novel treatment with steam. For this purpose, 1000 g of the resulting finely divided, free-flowing polymer gel is heated to 100°–105° C., with a wall temperature of the paddle drier of 130° C., and 1050 g of steam at 100° C. are passed through in the course of 2 hours. Before, during and after the steam treatment, samples are taken and analyzed. The results are summarized in Table 1.

TABLE 1

| Test time [min] | Solids content of polymer gel [%] | Tea-bag test [g/g] | Retention [g/g] | Increase in retention [%] | Residual acrylic acid in polymer gel [ppm] |
|---|---|---|---|---|---|
| 0 | 43.0 | 41.8 | 27.8 | 0 | 7000 |
| 30 |  | 45.7 | 30.4 | 9 | 60 |
| 60 |  | 51.3 | 34.8 | 25 | 40 |
| 90 |  | 58.4 | 39.5 | 42 | 50 |
| 120 | 44.6 | 59.0 | 41.6 | 50 | 30 |

EXAMPLE 2

Example 1 is repeated, except that in this case the crosslinking agent used is a polyethylene glycol diacrylate whose polyethylene glycol segment has a mean molecular weight of 300 g/mol. 1000 g of the resulting finely divided, free-flowing gel (particle diameter <5 mm) are heated to 97°–103° C., with a wall temperature of the paddle drier of 135° C., and are treated with 790 g of steam at 96° C. in the course of 2 hours. Before, during and after the steam treatment, samples are taken and analyzed. The results are shown in Table 2.

TABLE 2

| Test time [min] | Solids content of polymer gel [%] | Tea-bag test [g/g] | Retention [g/g] | Increase in retention [%] | Residual acrylic acid in polymer gel [ppm] |
|---|---|---|---|---|---|
| 0 | 43.6 | 36.1 | 21.8 | 0 | 1000 |
| 30 | | 39.0 | 23.3 | 7 | 300 |
| 60 | | 44.0 | 27.8 | 28 | 40 |
| 90 | | 46.0 | 29.8 | 37 | 20 |
| 120 | 43.7 | 48.3 | 31.5 | 44 | 20 |

EXAMPLE 3

Example 1 is repeated, except that the partially neutralized acrylic acid is polymerized in the presence of 0.035 mol % of methylene bisacrylamide as a crosslinking agent. 1000 g of the resulting finely divided, free-flowing gel (particle size 0.5-3 mm) are treated with 970 g of steam at 120° C. in the course of 2 hours by the abovementioned general method at a wall temperature of 130° C. and a temperature of the water-containing polymer gel of from 100° to 105° C. Before, during and after the steam treatment, samples are taken and analyzed. The results are summarized in Table 3.

TABLE 3

| Test time [min] | Solids content of polymer gel [%] | Tea-bag test [g/g] | Retention [g/g] | Increase in retention [%] | Residual acrylic acid in polymer gel [ppm] |
|---|---|---|---|---|---|
| 0 | 43.1 | 49.0 | 33.5 | 0 | 9000 |
| 30 | | 51.7 | 36.6 | 9 | 200 |
| 60 | | 54.2 | 39.3 | 17 | 60 |
| 90 | | 55.9 | 41.0 | 22 | 40 |
| 120 | 46.0 | 58.3 | 42.2 | 26 | 40 |

EXAMPLE 4

Example 1 was repeated, except that the partially neutralized acrylic acid is polymerized in the presence of 0.02 mol % of ethylene glycol dimethacrylate as a crosslinking agent. 1000 g of the resulting finely divided, free-flowing polymer gel (particle size 3-6 mm) are treated with 650 g of steam at 100° C. in the course of 1.5 hours by the abovementioned general method at a wall temperature of 130° C. and a temperature of the polymer gel of from 100° to 105° C. Before, during and after the steam treatment, samples are taken and analyzed. The results are summarized in Table 4.

TABLE 4

| Test time [min] | Solids content of polymer gel [%] | Tea-bag test [g/g] | Retention [g/g] | Increase in retention [%] | Residual acrylic acid in polymer gel [ppm] |
|---|---|---|---|---|---|
| 0 | 43.5 | 49.9 | 35.6 | 0 | 4000 |
| 30 | | 50.7 | 36.4 | 2 | 60 |
| 60 | | 53.4 | 37.9 | 7 | 50 |
| 90 | 47.3 | 56.8 | 43.1 | 21 | 30 |

EXAMPLE 5

Example 1 is repeated, except that a crosslinking agent is omitted and 0.1% by weight, based on the aqueous monomer solution, of potassium peroxydisulfate is used as the polymerization initiator. 1000 g of the resulting crosslinked, finely divided, free-flowing gel (particle size <6 mm) are treated with 700 g of steam at 120° C. in the course of 1.5 hours by the abovementioned general method at a wall temperature of 135° C. and a temperature of the gel of from 103° to 110° C. Before, during and after the steam treatment, samples are taken and analyzed. The results are shown in Table 5.

TABLE 5

| Test time [min] | Solids content of polymer gel [%] | Tea-bag test [g/g] | Retention [g/g] | FG [%] | Increase in retention [%] | Residual acrylic acid in polymer gel [ppm] |
|---|---|---|---|---|---|---|
| 0 | 43.2 | 37.6 | 24.5 | 43.2 | 0 | 6000 |
| 30 | | 44.3 | 28.6 | | 17 | 300 |
| 60 | | 56.4 | 35.3 | | 44 | 40 |
| 90 | 47.1 | 57.8 | 42.4 | 47.1 | 73 | 20 |

COMPARATIVE EXAMPLE 1

Example 1 is repeated with the sole exception that, instead of the novel steam treatment, the polymer is dried in a stream of nitrogen which is at 100° C., in the course of 5 hours. The results are summarized in Table 6.

TABLE 6

| Test time [min] | Solids content of polymer gel [%] | Tea-bag test [g/g] | Retention [g/g] | Increase in retention [%] | Residual acrylic acid in polymer gel [ppm] |
|---|---|---|---|---|---|
| 0 | — | 41.8 | 27.8 | 0 | 7000 |
| 60 | — | 41.4 | 26.3 | −5 | 800 |
| 120 | — | 42.9 | 28.4 | 2 | 700 |
| 180 | — | 42.7 | 27.8 | 0 | 300 |
| 240 | — | 41.7 | 27.4 | −1 | <100 |
| 300 | — | 41.2 | 26.3 | −5 | <100 |

EXAMPLE 6

A water-swellable, gel-like polymer is prepared by the process of Example 1 of EP-A 0 243 768, by reverse suspension polymerization of an aqueous solution of partially neutralized acrylic acid and N,N'-methylenebisacrylamide. 400 g of the substantially anhydrous, dry powder are swelled by the addition of 600 g of water, 1% by weight, based on the polymer, of a sodium $C_{14}$-alkyl-sulfonate is added and the resulting polymer gel is then treated with 980 g of steam at 100° C. in the course of 2 hours by the general method at a reactor wall temperature of 130° C. and a temperature of the swollen polymer gel of from 97° to 101° C. The results obtained are summarized in Table 7.

TABLE 7

| Test time [min] | Solids content of polymer gel [%] | Tea-bag test [g/g] | Retention [g/g] | Increase in retention [%] | Residual acrylic acid in polymer gel [ppm] |
|---|---|---|---|---|---|
| 0 | 38.2 | 51.1 | 33.5 | 0 | <100 |
| 60 | | 57.5 | 36.3 | 8 | <100 |
| 120 | 40.5 | 58.0 | 45.9 | 37 | <100 |

EXAMPLE 7

A water-swellable gel-like polymer prepared by the method stated in Example 1 of EP-A 0 243 768 (cf. Example 6) is dewatered not azeotropically but by filtration, 1% by weight of the sodium salt of a $C_{14}$-alkyl-sulfonate is added as a surfactant and the said polymer is then treated with 730 g of steam at 100° C. in the course of 1.5 hours by the abovementioned general method at a reactor wall temperature of 140° C. and a product temperature of from 99° to 105° C. The solids content of the water-containing polymer gel increases from 40.4% before the beginning of the steam treatment to 43.2% after the end of the treatment. The value for the retention increases from 25.4 to 31.0 g of water/g of polymer.

COMPARATIVE EXAMPLE 2

Example 6 is repeated, except that the substantially anhydrous, dry polymer powder is subjected to the steam treatment Even after a treatment time of 4 hours, in the course of which a total of 1750 g of steam are used at a temperature of the polymer powder of from 97 to 114° C., there is no detectable increase in the values for the teabag test or the retention values.

EXAMPLE 8

342 g of acrylic acid are neutralized to an extent of 75 mol % with sodium hydroxide solution, 0.35 mol % of methylenebisacrylamide is added and the mixture is diluted with water to a monomer content of 30% by weight. Nitrogen is passed through the aqueous monomer solution in order to remove oxygen, after which 3 g of potassium peroxydisulfate and 0.15 g of ascorbic acid are added and solution polymerization is initiated at room temperature. The polymerization is carried out in an insulated double-walled glass vessel. The maximum polymerization temperature is 96° C. The gel obtained is introduced in large pieces into a kneader and is comminuted there with the addition of 1% by weight, based on the polymer, of the sodium salt of a $C_{14}$-alkyl-sulfonate as a surfactant. A water-containing polymer gel in the form of particles having a diameter of from 2 to 8 mm is obtained. The finely divided, gel-like polymer is then heated to 101°-104° C. in the kneader at a wall temperature of 150° C. and is treated with 1020 g of steam at 110° C. in this temperature range in the course of 2 hours. Before, during and after the novel treatment, samples are taken and analyzed. The results are shown in Table 8.

TABLE 8

| Test time [min] | Solids content of polymer gel [%] | Tea-bag test [g/g] | Retention [g/g] | Increase in retention [%] | Residual acrylic acid in polymer gel [ppm] |
|---|---|---|---|---|---|
| 0 | 30.2 | 43.3 | 27.8 | 0 | 5000 |
| 60 |  | 50.7 | 34.3 | 26 | 200 |
| 120 | 32.7 | 52.8 | 37.4 | 37 | <100 |

EXAMPLE 9

Example 8 is repeated initially in such a way that a water-containing polymer gel is prepared by solution polymerization and, in contrast to Example 8, is then comminuted in a mincer, after which it is introduced into a kneader and is treated therein with 1% by weight, based on the polymer, of the sodium salt of a $C_{14}$-sulfonate. A finely divided polymer having particle sizes of from 0.1 to 5 mm is formed. This finely divided polymer gel is then heated to 98°–105° C. at a wall temperature of the kneader of 150° C. and is treated at this temperature for 2 hours with 1040 g of steam at 110° C. The results of the tests on samples are shown in Table 9.

TABLE 9

| Test time [min] | Solids content of polymer gel [%] | Tea-bag test [g/g] | Retention [g/g] | Increase in retention [%] | Residual acrylic acid in polymer gel [ppm] |
|---|---|---|---|---|---|
| 0 | 30.4 | 44.5 | 26.5 | 0 | 4000 |
| 60 |  | 50.7 | 34.4 | 30 | 100 |
| 120 | 33.6 | 51.9 | 36.5 | 38 | <100 |

EXAMPLE 10

Using the method stated in Example 1, 15 kg of the crosslinked water-containing polymer gel described therein are first prepared, introduced into a paddle drier and treated therein with 15 kg of steam at 140° C. in the course of 90 minutes at a wall temperature of 130° C. and a product temperature of from 120° to 125° C. and under a pressure of 2 bar absolute. Before, during and after the steam treatment, samples are taken and analyzed. The results are shown in Table 10.

TABLE 10

| Test time [min] | Solids content of polymer gel [%] | Tea-bag test [g/g] | Retention [g/g] | Increase in retention [%] | Residual acrylic acid in polymer gel [ppm] |
|---|---|---|---|---|---|
| 0 | 44.3 | 41.9 | 28.2 | 0 | 5000 |
| 30 |  | 48.4 | 36.8 | 30 | 70 |
| 60 |  | 49.4 | 38.3 | 36 | 50 |
| 90 | 45.2 | 55.8 | 40.6 | 44 | 60 |

We claim:

1. A process for improving the water absorption capacity of crosslinked, water-swellable polymers, wherein a water-containing, finely divided polymer gel having a solids content of from 20 to 65% by weight is treated with saturated or superheated steam at not less than 50° c., the solids content of the water-containing polymer gel increasing by not more than 10% by weight, and the polymer gel is then dried in a conventional manner.

2. A process as claimed in claim 1, wherein a polymer gel having a particle size of from 0.1 to 60 mm is treated with from 0.1 to 10 parts by weight of steam per part by weight of polymer gel.

3. A process as claimed in claim 2, wherein the steam acts on the polymer gel for from 10 minutes to 4 hours.

4. A process as claimed in claim 1, 2, or 3 wherein the solids content of the water-containing polymer gel increases about 0% by weight during the steam treatment.

5. A process as claimed in claims 1, 2 or 3, wherein said steam is saturated.

* * * * *